UNITED STATES PATENT OFFICE.

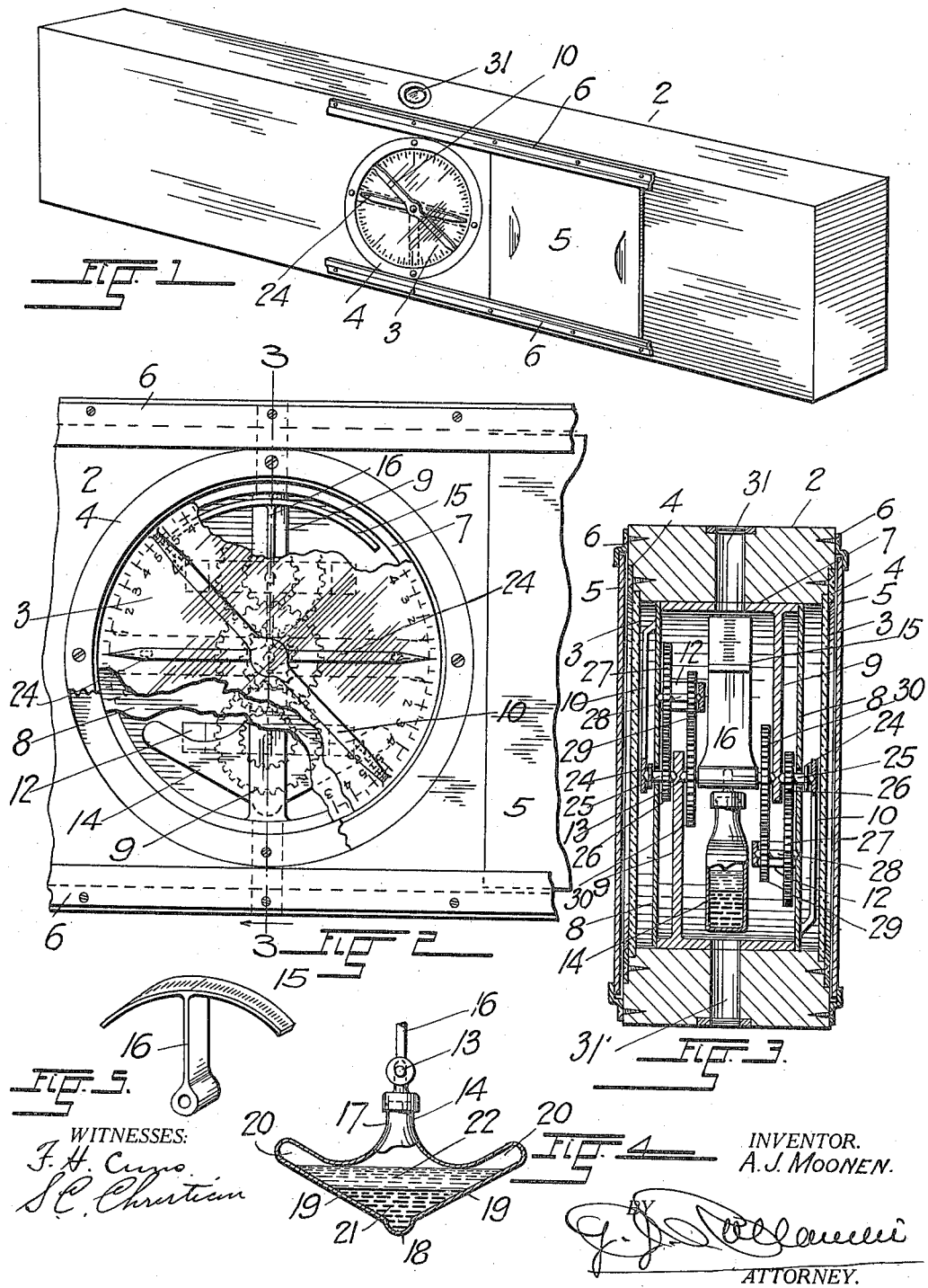

ARNOLD J. MOONEN, OF DENVER, COLORADO, ASSIGNOR TO THE NATIONAL AUTOMATIC LEVEL AND INSTRUMENT COMPANY, A CORPORATION OF COLORADO.

LEVELING INSTRUMENT.

1,164,544.  Specification of Letters Patent.  Patented Dec. 14, 1915.

Application filed May 8, 1914. Serial No. 837,225.

*To all whom it may concern:*

Be it known that I, ARNOLD J. MOONEN, a citizen of the United States, residing at Denver, in the county of Denver and State of Colorado, have invented certain new and useful Improvements in Leveling Instruments, of which the following is a specification.

This invention relates to leveling instruments and its primary object resides in providing in connection with an instrument of this character, mechanism of improved construction to accurately and speedily designate the angle at which a given surface to which the instrument is applied, extends with reference to a vertical or horizontal line.

Another object of my invention resides in the provision of means which enable the operator to read an angle determined by the use of the instrument at different points thereof.

In accordance with my invention, the instrument comprises in coöperative relation to a pair of circular dials which are applied at opposite sides of a straight-edged bar, pointers which through the instrumentality of a transmission gearing are connected with a pivoted plumb-bob. This plumb-bob consists of a vessel having inclined runways which extend in the plane of its arcuate movement and converge toward a pocket which normally is positioned in the perpendicular passing through the axis of oscillation of the vessel. Recesses at the ends of the runways are provided for the compression of air to aid in compelling a liquid with which the vessel is partly filled, to bring the bob and the parts operatively connected therewith, to a condition of rest.

The liquid contained in the vessel is preferably composed of a body of mercury to which are added proportionately small quantities of oil and alcohol, the former of which is provided to prevent corrosion and lubricate the surfaces with which the mercury comes in contact, while the other serves to keep the oil from congealing in cold weather.

The operating mechanism furthermore includes in operative connection with the plumb-bob, a graduated arc, the graduations of which may be read through sight openings in the upper and lower surfaces of the bar to designate the angle at which the latter is placed with relation to a horizontal or vertical plane.

The gearing which transmits the movement of the oscillating plumb-bob to the pointers is proportioned to cause the pointers to move at a greater velocity than the bob, and the circular scales on the dials are divided into degrees which are correspondingly larger than those of the circle in which the bob has its movement.

While in the accompanying drawings my invention has been illustrated as applied to what is commonly known as a spirit level, I desire it understood that the same may be equally effectively used in connection with surveying instruments and other devices which in their operation require adjustment to a specified angle with relation to a given line.

In the drawings in the various views of which like parts are similarly designated, Figure 1 is a perspective view of the level to which my invention is applied, Fig. 2, a fragmentary elevation of the same with part of the operating mechanism broken away, Fig. 3, a section taken along the line 3—3, Fig. 2, Fig. 4, a sectional elevation of the plumb-bob used in the instrument, and Fig. 5, a perspective view of the pivoted scale which is operatively connected with the plumb-bob.

Referring more specifically to the drawings, the reference numeral 2 designates the bar of a level which has a transverse cylindrical bore in which the operating mechanism is mounted, and which is closed at opposite sides of the bar by means of glass plates 3 held in place by the use of retaining rings 4. Covers 5 which are slidable in guide-ways 6 at opposite sides of the bar are provided to protect the plates 3 when the instrument is not in use.

The operative parts of the mechanism are mounted in a casing which is fitted in the bore of the bar and which is composed of a hollow, metallic cylinder 7 closed at its ends by means of the dial plates 8. Disposed within the casing in connection with its cylindrical wall, are webs 9 which provide bearings in alinement with the axis of the same, and brackets 10 and 12 are secured to the dial plates respectively in spaced relation to their outer and inner surfaces, for the rotary support of parts of the transmission gearing employed to increase the movement of the pointers of the instrument relative to the oscillating motion of the plumb-bob. Pivotally mounted between the webs 9, in the axis of the casing, is the main arbor 13 from which the plumb bob 14 is suspended and which carries the graduated, arcuate scale 15 at the end of an upwardly extending stem 16.

The plumb-bob consists of a vessel which comprises a neck 17 by means of which it is attached to the arbor, and a bottom surface composed of a central pocket 18, and two runways 19 which diverge upwardly and oppositely from the pocket. The portions of the vessel at the ends of the runways are contracted to provide recesses 20 for the compression of air by liquid entering the same during the oscillating movement of the vessel.

The mercury contained in the vessel is designated by the numeral 21, and the oil and alcohol by the numeral 22.

The pointers 24 placed exteriorly of the dials are secured upon arbors 25 which extending through central openings in the dials, are pivoted in axial alinement with the main arbor between the brackets 10 and the adjacent webs 9. The arbors 25 carry at points between the dials and the webs, pinions 26 which mesh with gear-wheels 27 of greater diameter on the counter arbors 28 which are rotatably supported between the inner surfaces of the dials and the brackets 12. The last mentioned arbors carry pinions 29 which operatively engage with gear wheels 30 of greater diameter mounted on the main arbor 13 interiorly of the webs on the casing. By thus transmitting the motion of the plumb-bob to the pointers, the slightest deviation of the bar from a horizontal or vertical plane will be plainly indicated on the dials, by the pointers which with reference to the movements of the bob, move through arcs of greater length.

The graduated scale 15 which being fixed on the main arbor, oscillates in unison with the plumb-bob, is visible through sight openings 31 which are formed in the upper and lower surfaces of the bar, axially in the vertical line in which the pocket 18 of the bob is positioned when the level is in a horizontal position.

The provision in the plumb-bob of two runways which diverge oppositely from a central pocket, compels the mercury to speedily find its position of rest and thereby arrest the movement of the pointers after the equilibrium of the bob has been disturbed, and the recesses formed at the ends of the runways aid in compelling the mercury to move toward the pocket in the center of the vessel, by the compression of air when the liquid enters the same.

Having thus described my invention what I claim and desire to secure by Letters-Patent is:

1. In an instrument of the class described, the combination with a dial and a pivoted pointer coöperating therewith, of means including a pivoted plumb-bob controlling the movement of said pointer and comprising a vessel the bottom of which has a central pocket and runways diverging oppositely therefrom in a plane transverse to the pivotal axis of the poise, and a liquid in said vessel.

2. In an instrument of the class described, the combination with a dial and a pivoted pointer coöperating therewith, of means including a pivoted plumb-bob controlling the movement of said pointer and comprising a vessel the bottom of which has runways diverging oppositely from a central point thereof, in a plane transverse to the pivotal axis of the poise, and recesses formed at the ends of said runways for the compression of air by liquid entering the same, and a liquid in said vessel.

3. In an instrument of the class described, the combination with a dial and a pivoted pointer coöperating therewith, of means including a pivoted plumb-bob controlling the movement of said pointer and comprising a vessel the bottom of which has a central pocket, runways diverging oppositely therefrom in a plane transverse to the pivotal axis of the poise, and recesses formed at the ends of said runways for the compression of air by liquid entering the same, and a liquid in said vessel.

4. In an instrument of the class described, an element having a chamber, coaxial dials at the opposite ends of said chamber, pointers coöperating with said dials, a plumb bob within said chamber, said pointers and said plumb bob being separately mounted for movement about a common axis coincident with that of the dials, and gearing for transmitting the movement of said bob to said pointers for their synchronous movements through angles of greater magnitude.

5. In an instrument of the class described, an element having a chamber, coaxial dials at opposite sides thereof, pointers coöperating with said dials, a plumb-bob within said chamber, said plumb-bob and said pointers being separately mounted for movement about a common axis coincident with that of the dials, gear wheels connected with said plumb-bob at opposite sides thereof, gear wheels connected with said pointers, and gearings mounted at opposite sides of said common axis respectively in operative engagement with said gear wheels and the respective pinions, for transmitting the movements of the plumb-bob to the pointers at an increased angular velocity.

6. In an instrument of the class described, an element having a chamber, coaxial dials at opposite sides thereof, pointers coöperating with said dials, a plumb-bob within said chamber, said plumb-bob and said pointers being separately mounted for movement about a common axis coincident with that of the dials, gear wheels connected with said plumb-bob at opposite sides thereof, and gear-trains mounted at opposite sides of the plumb-bob in operative connection with the same and with the two pointers, for transmitting the movements of the plumb-bob synchronously to the two pointers at an increased angular velocity.

In testimony whereof I have affixed my signature in presence of two witnesses.

ARNOLD J. MOONEN.

Witnesses:
G. J. ROLLANDET,
L. RHOADES.